UNITED STATES PATENT OFFICE.

OLAF TERP, OF LONDON, ENGLAND.

MANUFACTURE OF EMERY-WHEELS.

SPECIFICATION forming part of Letters Patent No. 514,391, dated February 6, 1894.

Application filed April 14, 1893. Serial No. 470,314. (Specimens.)

*To all whom it may concern:*

Be it known that I, OLAF TERP, a subject of the King of Denmark, residing at Forest Hill, London, in the county of Surrey, England, have invented a new and useful Improvement in the Manufacture of Emery-Wheels, Grindstones, Hones, Millstones, and the Like, of which the following is a specification.

My improvement refers to emery wheels, grindstones, hones, millstones, and the like, in which the emery, corundum or other granular abrasive material is bound together by a cement or cementitious material. For the purpose of my invention I make a saturated solution of chloride of calcium crystals, about equal proportions by weight of the chloride and the water. I also make a saturated solution of chloride of magnesium crystals about sixty-six per cent. by weight of the chloride and thirty-four per cent. of the water. Of these two solutions I make a mixture the average proportions of the same being about twenty per cent. by weight of chloride of calcium solution to eighty per cent. of the chloride of magnesium solution. The mixture solution thus obtained I mix with bitter earth (a form of oxide of magnesia produced in Frankenstein in Silesia, and known as "bittererde" but which may also be obtained elsewhere or may be manufactured artificially) about fifty-five per cent. of the former to forty-five per cent. of the bitter earth, to form a cement or cementitious material which I employ for binding together the emery, corundum, or other granular material to form emery wheels, hones, grindstones, millstones, or the like. The quantity of cement to be employed will vary according to the granular quality of the material. Thus for instance, for coarse emery No. 12, I use about twenty-five per cent. by weight of the cement to seventy-five of the emery, whereas for finer grades of emery more cement is required. The materials having been carefully mixed I put the mixture in molds of the required size and form to make wheels, grindstones, hones, and the like, and when dry that is to say after some six to twelve hours according to the size and character of the molded article and the state of the weather, I remove it from the mold and soak it (especially if it is to be used with water) in a mixture of petroleum and linseed oil or other suitable oil soluble in petroleum, about half of each, for the purpose of making it non-hygroscopic; this will take about five to twelve hours according to the size and character of the molded article. I then grind off the thin smooth outer skin or glaze of the article by means of an emery wheel or grindstone and water.

As regards the aforesaid mixture of chloride of calcium solution and chloride of magnesium solution, the proportions stated are average but they will depend somewhat upon the purpose for which the emery wheel or other article is to be used. For operating upon soft metals such as brass the amount of chloride of magnesium solution should be decreased and that of the chloride of calcium increased the variations however being within the limits of ten of the calcium chloride solution to ninety of the magnesium chloride solution, and thirty of the former to seventy of the latter.

My invention is also applicable to emery wheels and other similar articles made with a core of a cheaper material but instead of the usual wood core—which is objectionable, especially for high speed of rotation when the outer part is apt to separate therefrom and fly off in pieces—I make the core of sand or other cheap material bound together with my aforesaid cement, while the outer part of the article is made with the emery or other grinding material.

What I claim, and desire to secure by Letters Patent, is—

A grinding wheel provided with a coating consisting of a cement made of chloride of calcium, chloride of magnesium, water, and "bitter earth," with grains of emery embedded in said cement, substantially as described.

In testimony whereof I have hereunto set my hand in the presence of two witnesses.

OLAF TERP.

Witnesses:
 ARTHUR E. EDWARDS,
 EDMUND EDWARDS.